J. BLOCH.
CONVERTIBLE ELECTRIC SAD IRON AND HEATING AND COOKING STOVE AND LAMP.
APPLICATION FILED JAN. 7, 1918.

1,293,010.

Patented Feb. 4, 1919.

Inventor
Jacob Bloch
By
his Attorney

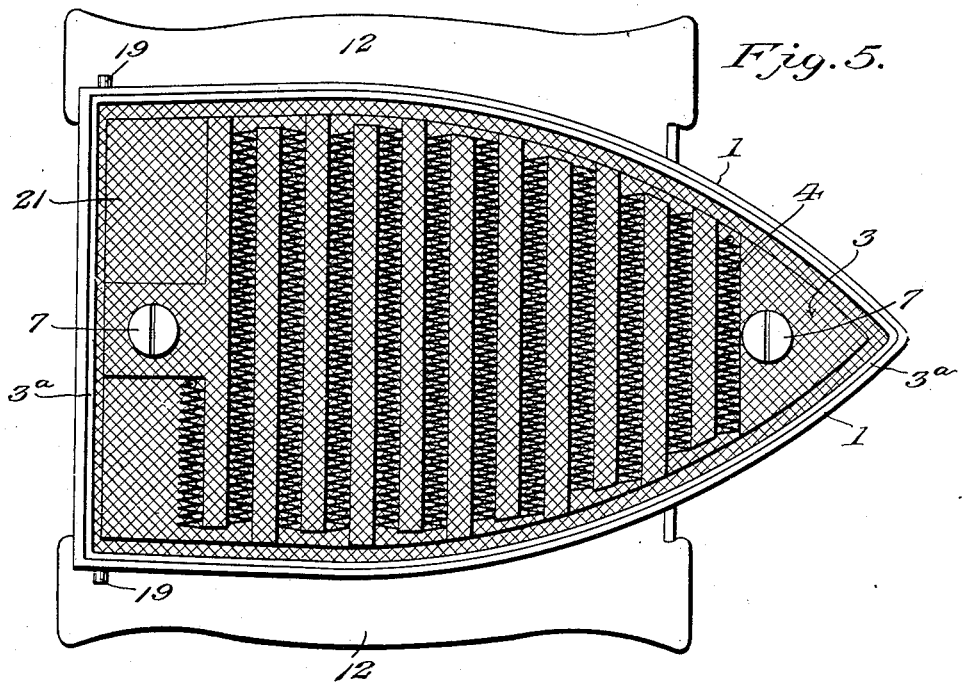
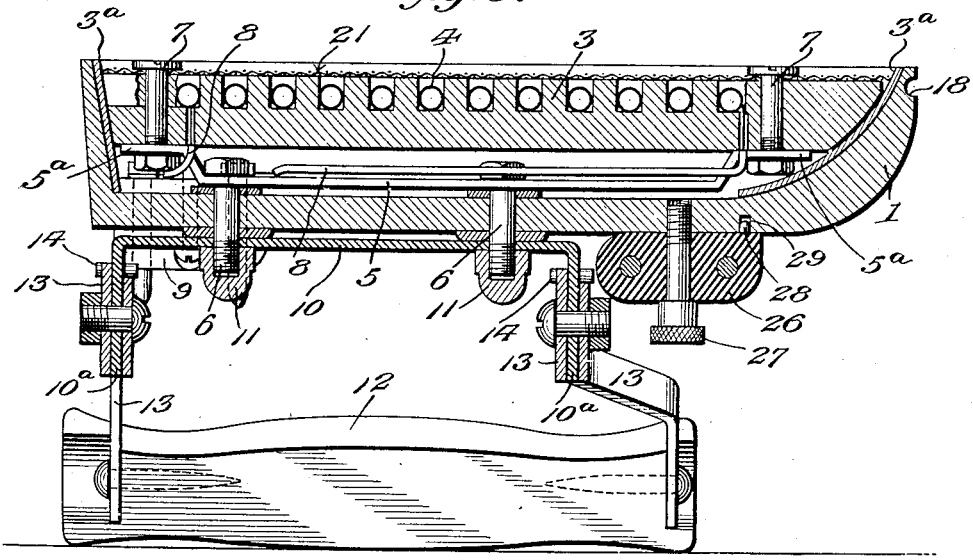

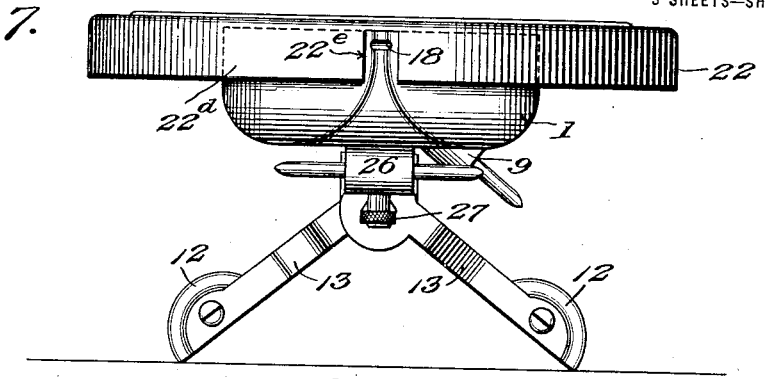
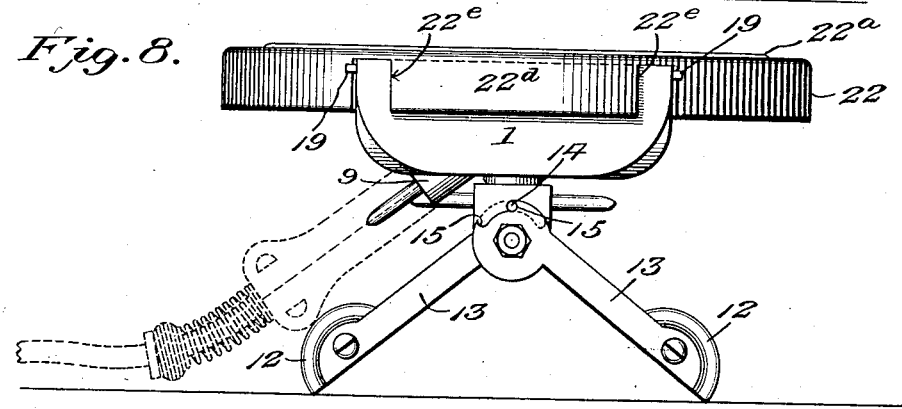
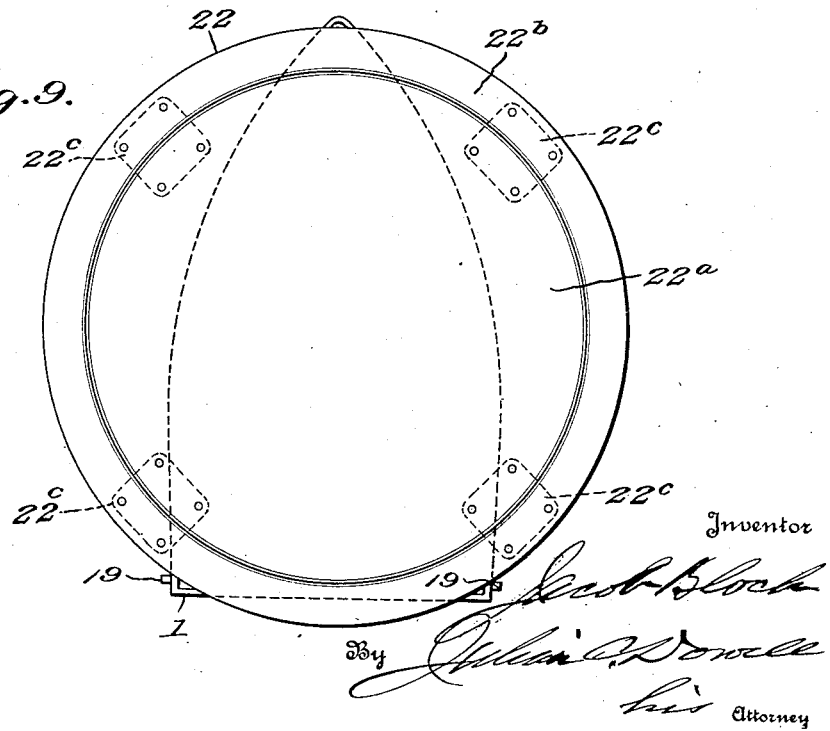

UNITED STATES PATENT OFFICE.

JACOB BLOCH, OF CINCINNATI, OHIO.

CONVERTIBLE ELECTRIC SAD-IRON AND HEATING AND COOKING STOVE AND LAMP.

1,293,010. Specification of Letters Patent. Patented Feb. 4, 1919.

Application filed January 7, 1918. Serial No. 210,721.

*To all whom it may concern:*

Be it known that I, JACOB BLOCH, a citizen of the United States, residing at Cincinnati, in the county of Hamilton and State of Ohio, have invented certain new and useful Improvements in Convertible Electric Sad-Irons and Heating and Cooking Stoves and Lamps; and I do hereby declare the following to be a full, clear, and exact description of the invention, such as will enable others skilled in the art to which it appertains to make and use the same.

The present invention relates to electrical appliances and more particularly to electric sadirons.

An object of the invention is to provide an electric sadiron which is so constructed as to permit it to be inverted and used as a heater, toaster, electric stove or table lamp.

A further object of the invention is to provide such a device as above mentioned which is simple in construction, easy to manipulate, neat in appearance and comparatively cheap to manufacture.

The invention will first be hereinafter more particularly described, with reference to the accompanying drawings, which form a part of this specification, and then pointed out in the claims at the end of the description.

In said drawings:

Fig. 5 is an inverted plan view of the sadiron with the base plate removed to adapt the device for use as a heater or toaster.

Fig. 6 is a vertical longitudinal sectional view through the sadiron in inverted position as shown in Fig. 5.

Fig. 7 is a front end view of the iron in its inverted position, with a circular cover plate disposed thereon adapting it for use as an electric stove.

Fig. 8 is a rear end view of the same, and

Fig. 9 is a plan of the iron as shown in Fig. 7.

Like characters denote similar and like parts throughout the specification and drawings.

Figure 1:
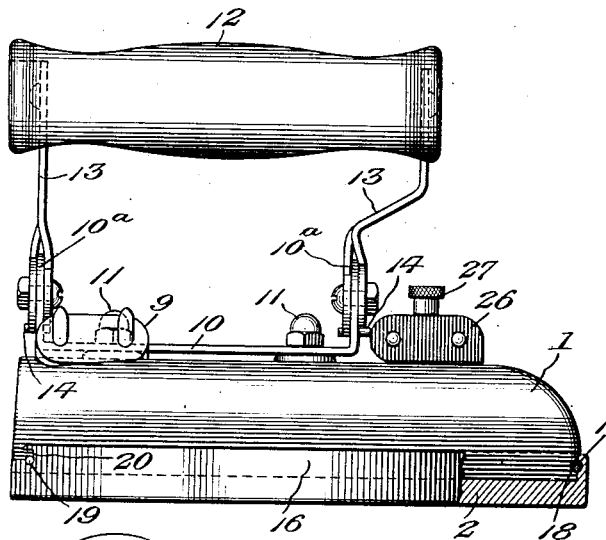
Figure 1 is a side elevation of the sadiron, showing portions in section to illustrate the connection of the detachable base plate.

With more particular reference to the drawings, in which a preferred embodiment of the invention is shown, 1 denotes the hollow body member of the iron having a substantially flat and polished base plate 2 removably secured thereto and closing the bottom of the body member.

The hollow body 1 contains a suitable heating element, which, in the present instance, is shown as an electric heating means comprising an insulating plate or block 3 having its surface opposing the removable plate 2 formed with a plurality of transverse grooves in which are disposed resistance coils 4 connected together in series. The insulating plate 3 takes the shape of the interior of the body 1 and is maintained in fixed position therein by means of the metal bar 5 (Fig. 6), which extends longitudinally of the body and is secured therein to the top wall thereof by bolts 6. The ends of the bar 5, which are connected to the insulating plate 3 by bolts 7, are offset laterally, as shown at 5ª, to hold the plate 3 close to the base plate 2.

The insulating plate 3 may be of asbestos or other suitable material, and there is provided a lining 3ª of asbestos or other heat non-conducting material, shown in Figs. 5 and 6, between the edges of the plate 3 and the walls of the body member 1. The resistance coils 4 are electrically connected by the conductors 8 (Fig. 6), with a suitable plug or socket 9 secured to the body member, preferably at the rear thereof, and which is to be connected to a suitable source of electric current. Although electric heating means has been shown and described, any other heating means may be employed.

Disposed externally of the body of the iron and extending longitudinally thereof is a metal strip 10 secured to its top wall by means of the bolts 6 which extend through said wall and are engaged by the nuts 11, the strip having its ends 10ª bent outwardly at substantially right angles.

The handle of the iron is slit longitudinally to form two complemental members 12, each of which is connected at its ends to the sadiron by the leg members 13 pivotally secured, in any suitable manner, to the ends 10ª of the strip 10. Thus the sections 12 of the handle may be spread apart in order that the members 13 may provide supporting legs for the body member when the iron is inverted to be used as a heater, toaster or the like, as illustrated in Figs. 5 to 9.

The spreading and closing movements of the handle sections are limited by the studs 14 rigid on the end portions 10ª and which engage stop-shoulders 15 formed on the circular and pivoted ends of the legs 13 by cutting away a portion of the circular ends, as shown.

Figure 2:
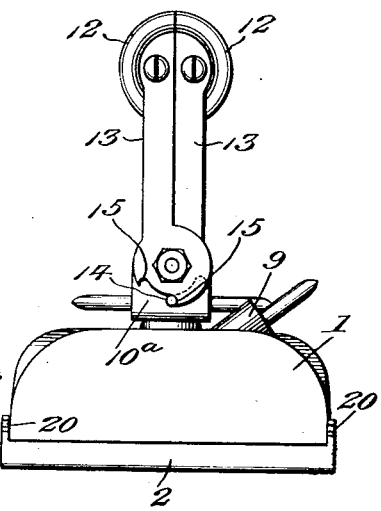
Fig. 2 is a rear end view of the same.
Figure 3:
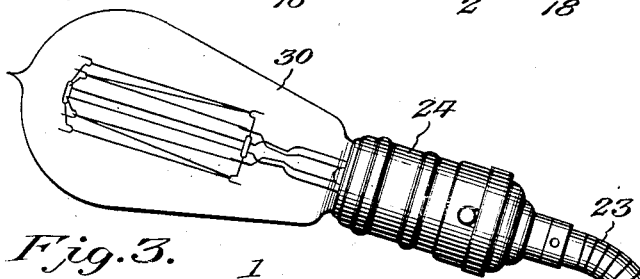
Fig. 3 is a plan view.
Figure 4:
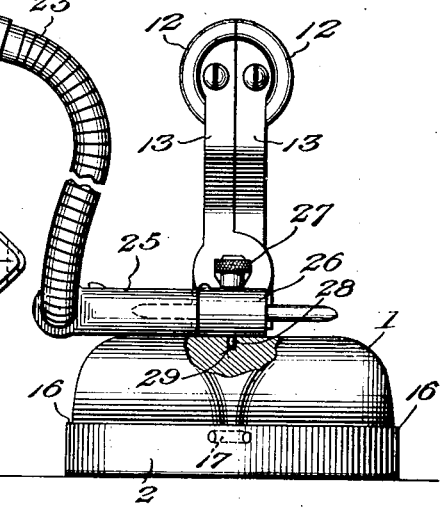
Fig. 4 is a front end view of the iron as shown in Fig. 1, illustrating the lamp bracket attached thereto.

The base plate 2 is substantially flat and takes the same formation of the body 1. The side edges of the plate have upstanding flanges 16 thereon which converge and meet at the forward end thereof and are adapted to envelop contiguous edges of the body member. Extending across the plate at the meeting point of the flanges 16 is a bar 17 secured to the flanges and receivable in a corresponding notch 18 formed in the forward end of the body 1. This bar 17, together with the studs 19, retain the removable plate 2 in position on the body, the studs 19 projecting from the body of iron at its rear end and receivable in bayonet slots 20 formed in the rear ends of the flange 16, which slots act to lock the plate in position (see Figs. 1 and 2). Thus it will be observed that the plate 2 may be readily attached and detached with great facility and celerity by manipulating it with a sliding movement.

When the iron is inverted for use as a heater it is arranged as shown in Figs. 5 and 6 with the plate 2 removed. A guard support 21 of reticulated material is provided and disposed between the resistance coils 4 and the base plate 2 to adapt the device for use as a toaster when in this position. The support 21 maintains the bread a suitable distance from the coils to cause an even toasting and is held in position by the bolts 7.

When used as a cooking stove a cover 22, preferably circular, is placed over the body 1, as shown in Figs. 7 to 9, the base plate 2 being removed, which cover provides a broad supporting surface upon which the cooking utensils are placed.

In order to prevent the cover from warping as result of excessive heating, it is constructed with a central portion 22ª surrounded by a ring portion 22ᵇ secured to the center portion by separate metal strips 22ᶜ, the ring having an annular depending flange 22ᵈ which is cut away at suitable points 22ᵉ to receive the corners of the body of the iron, as shown, thus preventing lateral displacement of the cover.

The invention also contemplates the provision of a lamp bracket 23 for detachable connection to the sadiron body 1. This bracket consists of a semi-rigid arm carrying a lamp socket 24 at one end and a connection plug or socket 25 at its other end for connection with a suitable plug 26 carried on the iron. The connecting element 26 is here shown as being a double plug secured to the forward end of the iron by a knurled screw 27 and having a projection 28 received in a recess 29 to prevent rotation of the plug 26 on the body member. To the double plug 26 is to be connected the socket 25 of the lamp bracket and a socket, not shown, having connection with an electric source to supply current to the lamp 30.

The attachment of the lamp bracket to the iron in the manner shown serves a twofold purpose. First, the iron serves as the base of a table lamp which may be covered with a fanciful shade; and, secondly, the lamp will illuminate the work being done immediately in the vicinity of the iron so that work may be more efficiently or satisfactorily done in dark or poorly lighted places.

The lamp will also serve a useful purpose, when the device is used as a cooking stove, by permitting the progress of the cooking to be clearly observed.

The bracket arm 23 may be of any desired length and its flexibility permits the lamp 30 to be adjusted in any desired position.

Having thus described my invention, what I claim as new and desire to secure by Letters Patent of the United States is:

1. A convertible sadiron and cooking, toasting and heating device, comprising a hollow body inclosing electric heating means and provided with a base plate and a handle on the side thereof opposite said base plate adapted to form legs for supporting said body in an inverted position when used for cooking or heating, and a layer of reticulated material between said heating means and said base plate to adapt the device for use as a toaster when said base plate is removed; said base plate being readily detachable to adapt the device for toasting when inverted.

2. A convertible electric sad iron and heating and cooking device comprising a hollow bottomless body containing electric heating means, a closure for said bottom consisting of a correspondingly shaped base plate having means thereon engaging means on said body for securing them together or taking them apart by sliding said base plate longitudinally, and a handle on the opposite side of said body composed of pivotally connected members adapted to swing apart to form supporting legs for said body in inverted position.

3. A convertible electric sad iron comprising a hollow bottomless body containing electric heating means and tapering toward its forward end, said end having a recess therein, a correspondingly shaped removable base plate having an upstanding marginal flange within which said body is seated and an inwardly extending projection at its tapered end engaging said recess; said upstanding flange having bayonet slots therein at its rear end, projections on said body adapted for interlocking engagement with said slots, and means for supporting said body in inverted position.

4. A convertible electric sad iron and heating and cooking device comprising a hollow bottomless body containing electric heating means, a removable base plate closing said bottom, and a toasting plate disposed between said heating means and said removable plate, together with means for supporting said body in inverted position.

5. A self-heating iron of the character described, comprising a body member containing a heating means, a pair of brackets secured to the body, a pair of legs pivotally connected to each bracket, and two complemental handle sections each connecting a leg of each pair, said legs being adapted to be spread apart to provide supporting legs when the iron is inverted.

6. A self-heating iron of the character described, comprising a body member containing a heating means, a pair of brackets secured to the body, a pair of legs pivotally connected to each bracket and having shoulders on the pivoted ends thereof, two complemental handle sections each connecting a leg of each pair, said legs being adapted to be spread apart to provide supporting legs when the iron is inverted, and studs on the brackets to engage with said shoulders to limit the spreading and closing movements of the legs.

7. In an electric sad iron, a hollow bottomless body having a handle and containing electric heating means, a removable base plate serving as a closure for said bottom and interlocking means on said body and base plate for securing them together, said means comprising a bayonet-joint connection between said body and base plate at one end and means on said base plate at the other end thereof adapted to engage a recess in said body, whereby the base plate and body may be firmly secured together and easily taken apart by sliding movement of said base plate longitudinally to effect engagement or disengagement of said interlocking means.

8. A convertible sad iron and heating, cooking and toasting device, comprising a hollow bottomless body of flatiron form containing electric heating means, a layer of reticulated material overlying said heating means, a removable base plate covering said material and forming a closure for said bottom, means on the opposite side of said body adapted to serve as a handle therefor for use as an ordinary sad iron and as a support for said body when inverted; said base plate and body having interengaging means thereon, whereby the base plate may be easily detached by disengaging said interengaging means to adapt the iron to be used in inverted position for heating and cooking purposes and for toasting when said base plate is removed.

9. A convertible electric sad iron and heating and cooking device comprising a hollow bottomless body of flatiron form containing electric heating means, a correspondingly shaped base plate forming a closure for said bottom, means on the opposite side of said body serving as a handle therefor when used as an ordinary sad iron and adapted to support said body in inverted position; said base plate and body having inter-engaging means thereon whereby said base plate may be readily removed when the iron is inverted to adapt the device for use for heating or cooking purposes, and a cover having means thereon for attachment to said body when said base plate is removed, so as to provide a broad support upon which cooking utensils may be placed.

10. The combination with a self-heating sadiron adapted to be inverted for use as a stove, of a relatively broad cover plate to rest upon the inverted iron and comprising a central portion surrounded by a separate rim secured to the central portion, said rim having a depending flange formed with cutaway portions in which the corners of the iron engage to prevent lateral displacement of the cover plate.

11. The combination in an electric sad iron, of a hollow bottomless body containing electric heating means and having on the upper side thereof a handle and on its under side a removable base plate closing said bottom, said handle being composed of separable members pivotally connected and adapted to swing apart to form supporting legs for said body when inverted, and a cover adapted to fit over said body when said base plate is removed, to provide a broad supporting surface for cooking utensils.

12. An invertible electric sad iron and heating and toasting device comprising a hollow bottomless body containing electric heating means, a handle constructed to provide supporting legs on which said body may rest in inverted position, a removable base plate closing said bottom, and a support of reticulated material interposed between said base plate and said heating means on which bread to be toasted may be placed when said base plate is removed.

In testimony whereof I affix my signature in the presence of two witnesses.

JACOB BLOCH.

Witnesses:
FELIX ELSBACH,
CARRIE DAVIS.